United States Patent [19]

Bair et al.

[11] Patent Number: 5,061,089

[45] Date of Patent: Oct. 29, 1991

[54] TAPERED BEARING ISOLATOR

[75] Inventors: John J. Bair, Union Lake; Gerald D. Damon, Farmington; Eugene R. Braun, Royal Oak, all of Mich.

[73] Assignee: Eaton Corporation, Cleveland, Ohio

[21] Appl. No.: 509,396

[22] Filed: Apr. 16, 1990

[51] Int. Cl.[5] .................. F16C 27/00; F16C 27/04
[52] U.S. Cl. .................. 384/535; 384/517; 384/563; 384/571; 384/581
[58] Field of Search .............. 384/517, 518, 535, 536, 384/563, 571, 581, 582, 585

[56] References Cited

U.S. PATENT DOCUMENTS

| | | | |
|---|---|---|---|
| 2,504,776 | 4/1950 | Woodfield et al. | 384/535 |
| 2,506,404 | 5/1950 | Woodfield et al. | 384/535 |
| 2,534,142 | 12/1950 | Morton et al. | 384/535 |
| 2,733,108 | 1/1956 | Cowles | 384/582 |
| 3,214,224 | 10/1965 | Lash | 384/517 |
| 3,309,154 | 3/1967 | Stokely | 384/536 |
| 3,385,543 | 5/1968 | Jakel | 384/582 |
| 3,424,508 | 1/1969 | Kizer et al. | 384/535 |
| 3,709,570 | 1/1973 | Galbate | 384/536 |
| 3,934,957 | 1/1976 | Derner | 384/563 |
| 4,422,780 | 12/1983 | Glaeser | 384/215 |
| 4,825,718 | 5/1989 | Seifert | 74/574 |

FOREIGN PATENT DOCUMENTS 1022182  3/1953  France ................ 384/535

Primary Examiner—Thomas R. Hannon
Attorney, Agent, or Firm—H. D. Gordon

[57] ABSTRACT

A bearing isolator assembly (70) suitable for use with tapered bearings (20) is provided. The bearing isolator assembly comprises a retaining member (72), a radial wave spring (74) and a separate axial wave spring (76).

16 Claims, 4 Drawing Sheets

TAPERED BEARING ISOLATOR

RELATED APPLICATIONS

This application is related to U.S. application Ser. No. 509395 titled ROLLER AND BALL BEARING BEARING ISOLATOR, assigned to the assignee of this application and filed the same day, Apr. 16, 1990, as this application.

BACKGROUND OF THE INVENTION

Field of the Invention

This invention relates to bearing isolators for mounting tapered bearings to supporting structures to isolate the supporting structures from the axial and the radial vibrations and oscillations that the bearings, and the shafts rotatably supported thereby, are subject to. More particularly, this invention relates to isolators utilized in connection with tapered bearings rotatably supporting torque transmitting shafts in vehicular mechanical change gear transmissions.

Resilient, flexible and/or cushioned bearing mounts or isolators utilized to isolate a support member from the vibrations and oscillations to which a bearing and the rotatably supported member, most often a shaft of some type, is subject to are, of course, well known in the prior art. Examples of such prior art devices may be seen by reference to U.S. Pat. Nos. 2,733,108; 3,309,154; 3,385,543; 3,709,570; 4,422,780 and 4,825,718, the disclosures of all of which are hereby incorporated by reference.

Vehicular drivetrain components such as drive axles and mechanical change gear transmissions which utilize bearings, included tapered bearings, to rotatably support torque transmitting members, usually comprising some type of shafts, in a housing are well known in the prior art as may be seen by reference to U.S. Pat. Nos. 4,788,889; 4,754,665; 4,736,643; 4,735,109; 4,709,590; 4,373,403; 4,761,867 and 4,678,017, the disclosures of all of which are hereby incorporated by reference.

The use of bearing isolators and/or of cushioned, resilient and/or flexible bearing mounts in drivetrain components to isolate the drive train component housing from shaft and gear vibrations and oscillations to reduce wear, to dampen the vibrations or oscillations, to increase vehicular occupant comfort and/or to minimize drive train noise is known. However, the previous resilient bearing mounts/bearing isolators were not totally satisfactory as the prior art devices were complicated and/or expensive to manufacture and/or assemble, utilized rubber and/or other nonmetallic materials which were expensive, not totally elastic, not of a proper spring, not long wearing, and/or excessively sensitive to temperature and lubricants, and/or did not provide isolation in both the axial and the radial directions and/or did not limit deflection and stress of the resilient members.

SUMMARY OF THE INVENTION

In accordance with the present invention, the drawbacks of the prior art have been minimized or overcome by the provision of a new and improved relatively simple, inexpensive all metallic bearing isolator for tapered as well as ball and roller bearings.

The above is accomplished by providing a bearing isolator comprising three principal components, each all metallic (preferably of a suitable steel) and each of a relatively simple and inexpensively produced structure.

The principal components of the isolator of the present invention include (i) an annular, flanged wear ring/retainer sleeve for receipt in the bearing support apertures of the housing support walls, (ii) a generally tubular shaped radial wave spring which is resiliently radially deformable and is resiliently radially deformed between the inner diameter of the retainer and the outer diameter of the retained bearing outer race, and (iii) a generally washer shaped axial wave spring which is resiliently axially deformable and is resiliently deformed between the axially outer end wall of the retained bearing outer race and a surface defined by the housing. In certain mountings, a wear ring and/or spacers or shims may be axially interposed a fixed surface of the housing and the axial wave spring. Preferably, the retainer sleeve will include a nonresilient radial bump stop for limiting radial deflection and stress of the radial wave spring.

Preferably, the radial and axial wave springs are made of a spring steel, such as for example SAE 6150 or the like, while the retainer and wear rings are made of a standard gear or shaft steel, such as SAE 1010, 1018 or 1020 or the like which is preferably surface hardened.

Accordingly, it is an object of the present invention to provide a new and improved bearing isolator which is of a relatively simple, preferably all metallic, construction and which is suitable for use with tapered as well as ball and roller bearings.

This and other objects and advantages of the present invention will become apparent from a reading of the detailed description of the preferred embodiment taken in connection with the attached drawings.

DESCRIPTION OF THE PREFERRED EMBODIMENT

Figure 1:
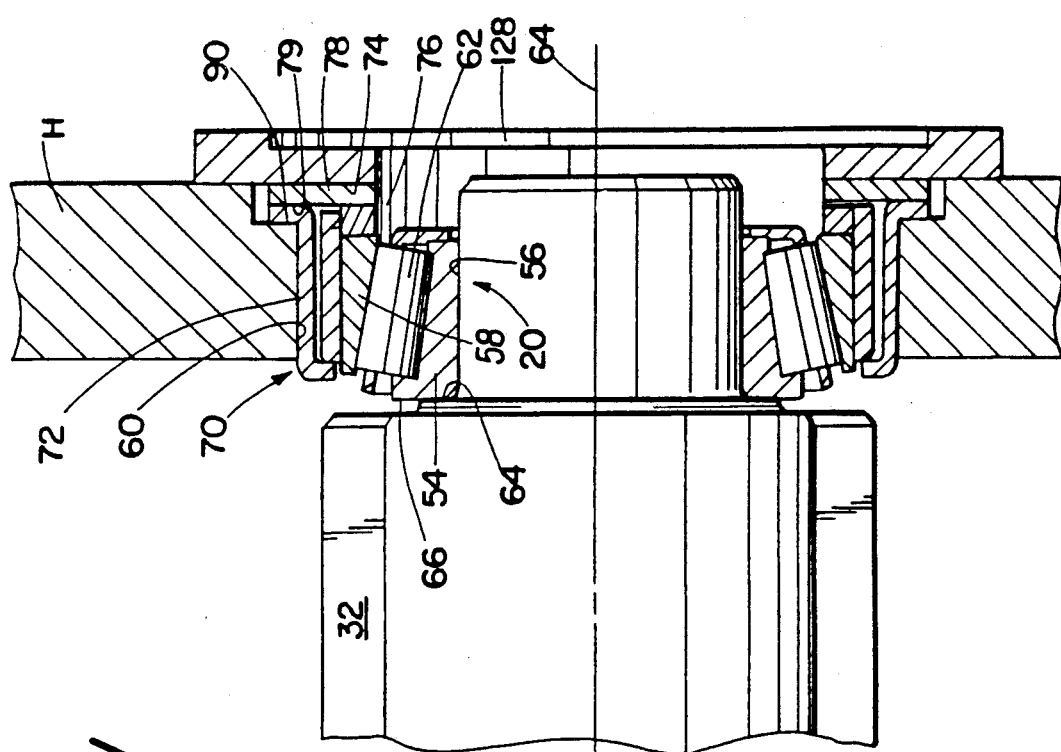
FIG. 1 is a partial sectional view of a vehicular transmission utilizing the bearing isolators of the present invention.

In this disclosure, certain terminology will be used for convenience and reference only and will not be limiting. For example, the terms "forward" and "rearward" will refer to directions forward and rearward of the transmission as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus being described. The terms "upward" and "downward"

will refer to directions taken in the drawings in connection with which the terminology is used. All of the foregoing terms include the normal derivatives and equivalents thereof.

Figure 1A:
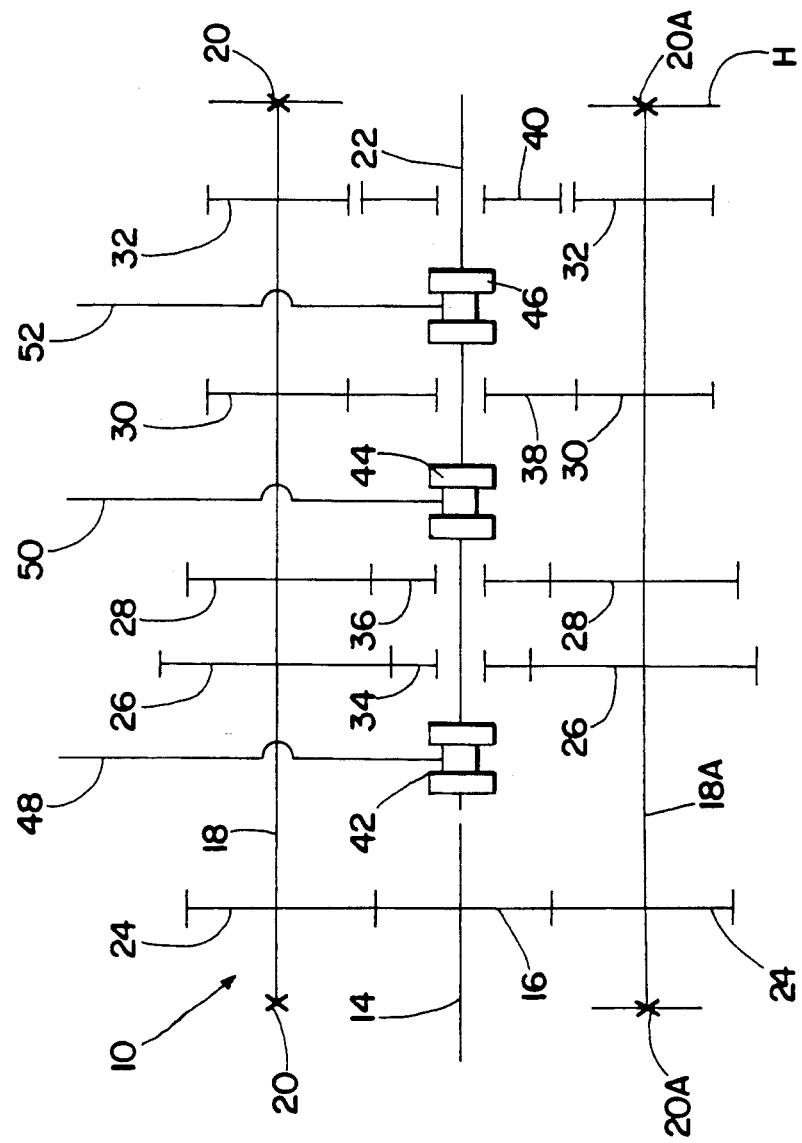
FIG. 1A is a schematic illustration of a typical change gear transmission as illustrated in FIG. 1.

A typical change gear transmission or transmission section 10 with which the bearing isolator assembly or the present invention may be advantageous utilized may be seen by reference to FIGS. 1 and 1A. Transmission 10 is a simple transmission, or transmission section, of the twin countershaft type which is well known in the prior art and which may be understood in greater detail by reference to U.S. Pat. Nos. 3,105,395; 3,611,823; 4,152,949; 4,445,393 and 4,194,410, the disclosures of all of which are hereby incorporated by reference.

The illustrated transmission 10 comprises an input shaft 14 carrying an input gear 16 for rotation therewith. The input shaft 14 is intended to be driven by a prime mover (not shown) through a master clutch or torque converter (not shown) as is well known in the art. A pair of substantially identical countershafts 18 and 18A are rotatably mounted in the housing by means of tapered bearings 20 and 20A. A main or output shaft 22 is provided which is preferably floatingly and/or pivotably mounted in the transmission housing H.

Each of the countershafts 18 and 18A carry countershaft gears 24, 26, 28, 30 and 32 fixed thereto for rotation therewith. Countershaft gear 24 is constantly meshed with the input gear 16. Third speed main shaft gear 34 surrounds main shaft 22 and is constantly meshed with and supported by the countershaft gears 26. Second speed mainshaft gear 36 surrounds mainshaft 22 and is constantly meshed with and supported by countershaft gear 28. First speed mainshaft gear 38 surrounds mainshaft 22 and is constantly meshed and supported by the countershaft gears 30. The reverse mainshaft gear 40 surrounds mainshaft 22, and is constantly meshed with and supported by a pair of idler gears (not shown) which, in turn, are constantly meshed with and driven by the countershaft gears 32. Preferably, as is well known in the art, mainshaft gears 34, 36, 38 and 40 are radially movable relative to mainshaft 22. The advantages of utilizing a floating mainshaft 22 and/or floating mainshaft gears are well known in the art and may be appreciated in greater detail by the aforementioned U.S. Pat. No. 3,105,395.

Axially slidable jaw clutches 42, 44 and 46 are mounted, preferably by a splined connection, to mainshaft 22 for axial sliding movement relative thereto, and for rotation therewith. Clutch 42 may be moved to the left from the neutral position shown to selectably couple the mainshaft 22 directly to the input gear 16 and input shaft 14 for fourth or direct drive of transmission 10, or moved rightwardly from the position shown to engage mainshaft gear 34 with mainshaft 22 for third speed operation of transmission 10. Clutch 44 may be moved from the position shown leftwardly to engage mainshaft gear 36 with mainshaft 22 for second speed operation or may be moved rightwardly from the position shown to engage mainshaft gear 38 with mainshaft 22 for first speed operation of transmission 10. Clutch 46 may be moved rightwardly from the neutral position shown to engage mainshaft gear 40 with mainshaft 22 for reverse operation of transmission 10. Of course, clutches 42, 44 and 46 may be positive clutches, friction clutches, lock clutches and/or synchronized clutches.

A shift fork or yoke 48 is received in a groove in clutch 42 for controlling the axial position of clutch 42 relative to mainshaft 22. A shift fork 50 is received in a groove in clutch 44 for axially controlling the position of clutch 44 relative to mainshaft 22. A shift fork 52 is received in an axial groove in clutch 46 for controlling the axial position of clutch 46 relative to mainshaft 22. As is known, the axial positioning of the shift forks is controlled by a shift bar housing assembly or the like.

As indicated above, countershaft 18 and the gears rotatably secured thereto are substantially identical to countershaft 18A and the gears rotatably associated therewith. Accordingly, only the rotational support of countershaft 18 in housing H will be described in detail herein with the understanding that the rotational support of countershaft 18A is substantially structurally and functional identical thereto.

As may be seen in greater detail by reference to FIG. 1, countershaft 18 is rotatably supported in housing H by means of taper bearings 20, each of which, with the possible exception of a size difference, is substantially functionally and structurally identical and of a well known prior art construction.

Briefly, each of the tapered bearings includes an inner race 54 adapted to be snugly received on a reduced diameter portion 56 of the countershaft 18, an outer race 58 adapted to be snugly received within a bore 60 of the support housing H and a plurality of rollers 62 each rotatable about an axis inclined with respect to the common axis 64 of the shaft 18 and the inner and outer races of the bearing. The outer bearing race defines an outer diameter surface 59 directly or indirectly mounted in bore 60 and also defines an axially inwardly facing surface 61. In a typical installation, countershaft 18 will include an axially outwardly facing shoulder 64 which will cooperate with an axially inwardly facing surface 66 provided on the inner race 54 of the bearing whereby axial forces acting on the countershaft 18 would be transmitted through the bearing to the housing H.

The bearing isolator assembly 70 of the present invention is comprised of three main components, namely a retainer member 72, a radial wave spring member 74 and an axial wave spring member 76. One or more of the bearing isolator assemblies 70 may also include a generally washer shaped wear ring 78 designed principally to minimize the wear caused by axial forces on one or more of the bearings.

Preferably, for purposes of simplicity of machining, minimization of material costs and improved resistance to wear and temperature and lubricant damage the retainer 72 and the wear ring 78 are made of a suitable surface hardened steel material, such as SAE 1018-1029 steel, for example, while the radial wave spring 74 and the axial wave spring 76 are of a suitable spring steel such as, for example, SAE 6150 steel.

Figure 2:
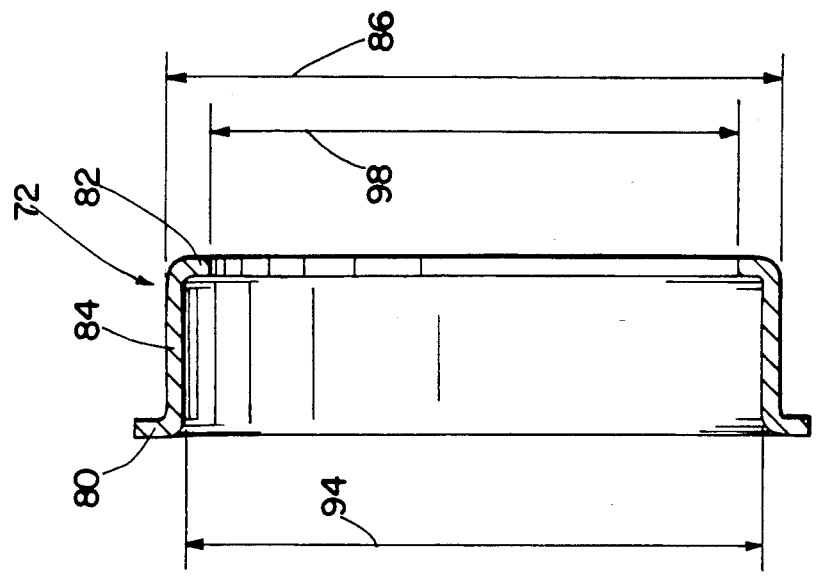
FIG. 2 is a sectional view of the retainer portion of the bearing isolator of the present invention.

As may be seen in greater detail by reference to FIG. 2, the retainer 72 is of a generally tubular shape having a radially outwardly extending flange 80 at one axial end thereof and a radially inwardly extending flange 82 at the opposite axial end thereof. The generally tubular intermediate portion 84 of the retaining member has an outer diameter 86 generally equal to the inner diameter of the bearing receiving aperture 60 provided in the housing and is axially retained in the housing by means of flange 80 interacting with a shoulder 90 provided in the housing.

Figure 3:
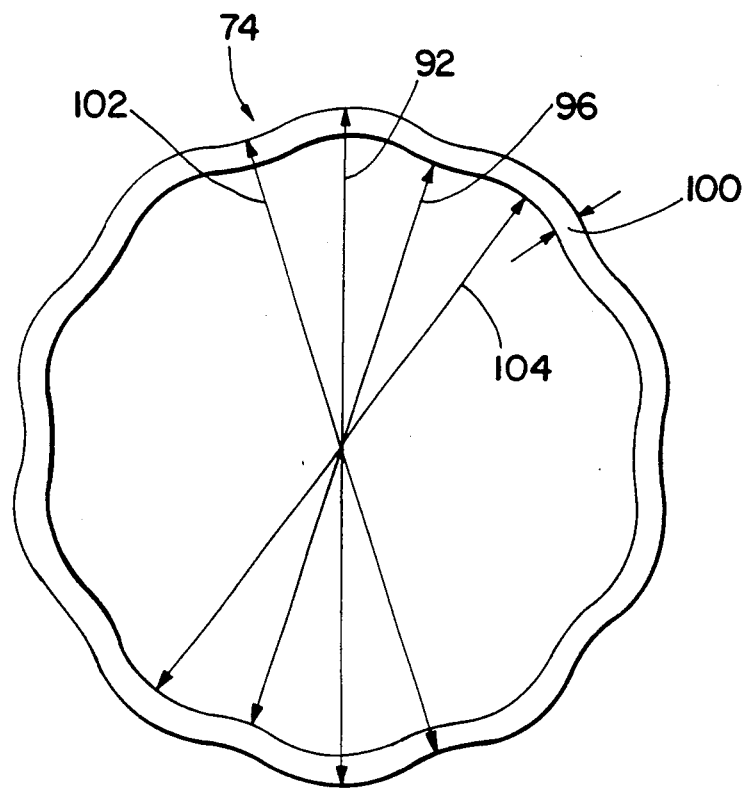
FIG. 3 is an elevational view of a radial wave spring member of the bearing isolator of the present invention.
Figure 4:
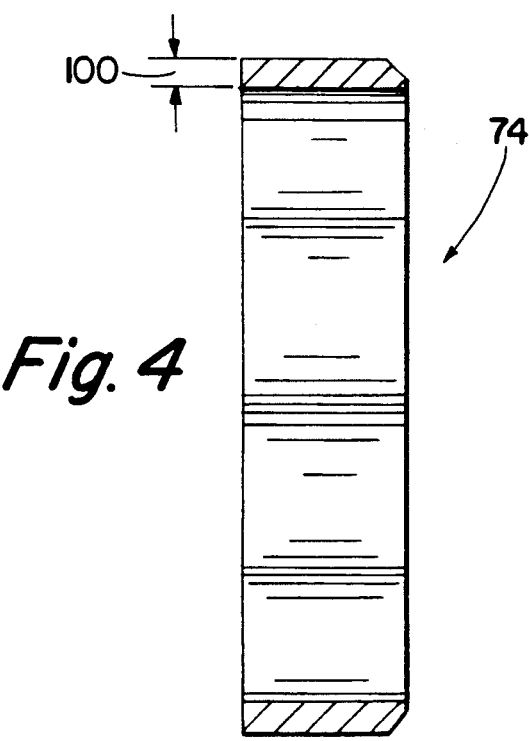
FIG. 4 is a side view, in section, of the radial wave spring illustrated in FIG. 3.

A radial wave spring 74, see FIG. 3 and FIG. 4, is telescopically received within the tubular body portion 84 of the retainer member and defines a major or maximum outer diameter 92 which is slightly less than or equal to the inner diameter 94 of the tubular portion 84 of the retaining member 72. The radial wave spring 74 also defines a minor or minimum inner diameter 96 which is slightly less than the inner diameter 98 defined by inwardly extending flange portion 82 of the retainer 72. The radial wave spring is designed to be received in a press fit relationship on the outer diameter of the outer bearing race 58 of the tapered bearings 20 as may be seen by reference to FIG. 1. Further, the inner diameter 98 defined by the inwardly extending flange 82 of the retainer is less than the outer diameter 92 of the radial wave spring and thus the radial wave spring is axially retained relative to the housing H by the retaining member 72.

The inner diameter 98 of the inwardly extending flange 82 can be sized to limit the maximum radial movement the bearing 20 so as to limit radial deflection and stress of the radial wave spring 74.

Referring specifically to FIGS. 3 and 4, it may be seen, that the radial wave spring member 74 is a generally tubular member with a substantially constant, with the possible exception of a slight end chamfer, cross sectional radial wall thickness 100. The radial outer diameter varies from a major or maximum value 92 to a minor or minimum value 102, and the radial inner diameter varies from a minor or minimum value 96 to a major or maximum value 104, in a substantially periodic smoothly and continuous manner with the maximums and minimums occurring at at least three generally equally spaced circumferentially spaced locations. As the radial wave spring is of a spring steel, it is substantially resiliently deformable to allow a predetermined amount of resilient radial movement of the rotational axis 65 of the bearings 20 and the shaft 18 rotatably supported thereby.

As the radial wall thickness 100 of the radial wave spring is substantially constant, the major outer and inner diameters, and the minor outer and inner diameters, will occur at the same circumferential position about the generally tubular radial wave spring. Preferably, the difference in magnitude between the major and minor outer diameters, and between the major and minor inner diameters, will be in the range of 0.1% to 50.0% of the mean values thereof.

The axial wave spring member 76 is a generally washer shaped member having an outer diameter 106 generally equal to the minor inner diameter 96 of the radial wave spring and an inner diameter 108 generally equal to the inner diameter of the axially outermost portion of the outer bearing race 58 of tapered bearing 20. Accordingly, the axial wave spring 76 defines an axially inwardly facing surface for axial engagement by the axially outwardly facing surface of the outer bearing race 58 whereby axial forces transmitted from shaft 18 to bearing 20 are further transmitted by the axial wave spring to the housing H.

Figure 5:
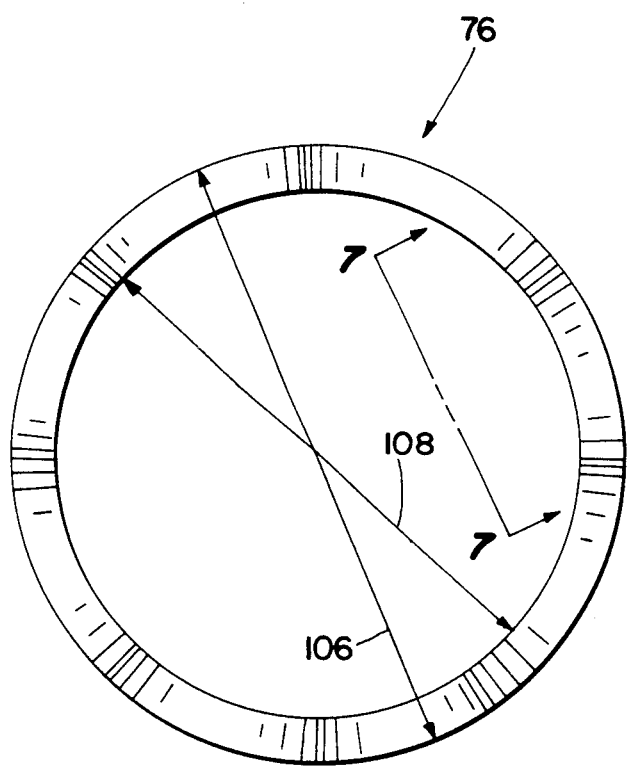
FIG. 5 is an elevational view of the axial wave spring member of the bearing isolator of the present invention.
Figure 6:
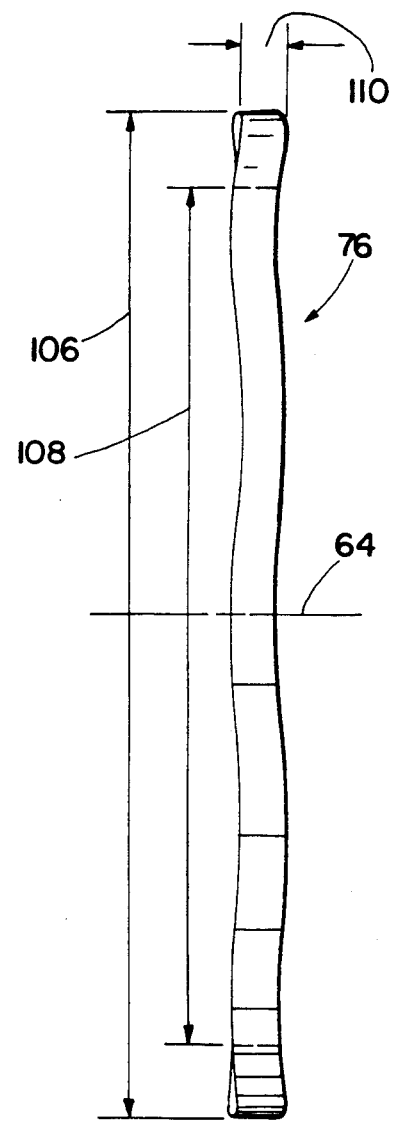
FIG. 6 is a side view, in section, of the axial wave spring illustrated in FIG. 5.
Figure 7:
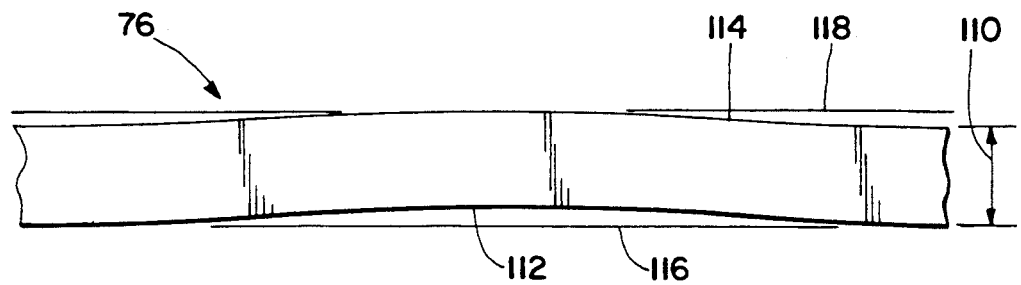
FIG. 7 is an enlarged view, rotated out of position and flattened out, taken along the arrows 7—7 in FIG. 5.

Referring now specifically to FIGS. 5, 6 and 7, it may be seen that the axial wave spring is of a substantially constant axial wall thickness 110. The displacement of the wave spring axially outermost surface 112 and axially inwardmost surface 114 from a fixed plane perpendicular to axis 64 is substantially smoothly, continuously and periodically axially varying. Accordingly, the axial displacement axially outermost surface 112 and the axially innermost surface 114 will vary from radially outermost plane 116 and radially innermost plane 118, which planes are defined by the most axially outwardly and most axially inwardly portion of surfaces 112 and 114, respectively, in a smooth continuous manner such that the axial distance between most axially outwardly plane 116 and the axially inward surface 114 may vary by an amount having a value in the range of 10% to 25% of the wall thickness 110. The axially outwardlymost surface 112 is at its maximum displacement from axially outwardlymost plane 116, and the axially inwardlymost surface 114 is axially displaced from the axially inwardlymost plane 118 by a maximum axial displacement, at at least three or more circumferentially spaced locations about the axial wave spring 76.

Referring to FIG. 1, as the axial wave spring is made of a resilient spring steel, the axial wave spring 76 is resiliently deformable in the axial direction whereby axial displacements, oscillations and vibrations of shaft 18 as transmitted through taper bearing 20 are isolated or dampened relative to housing H. One or more of the bearing isolator assemblies 70 may include the additional component of a wear ring 78 simply to provide a steel component interposed the bearing and isolator members and the housing members and associated components which are typically of a cast metal material or the like. The wear rings define a fixed axially inwardly facing surface 79 for interaction with the axial wave springs 76.

Referring again to FIG. 1, at the forward or leftward end of transmission 10, a shim or spacer 120 is held to the housing H by a series of screws 122 and interacts with the clutch housing cover 126 to mount the bearing isolator assembly 70 to the housing H. At the rearward or rightward end of the transmission 10, a bearing cover member 128 interacts with housing H to retain the bearing isolator assembly 70 and taper bearing 20 in the housing H. The shims define a fixed axially inwardly facing surface 121 of the housing for interaction with the isolator axial wave spring 76. As is known, the axial thickness of shim or spacer 120 is selected to put a predetermined axial force on the two taper bearings 20 to maintain a proper preload of same. The axial wave spring 76 provides a cushion to limit excessive axial bearing loading if the shaft end clearance is undersized.

Preferably, the axial and the radial spring rate of the axial and radial wave springs is in the range of 10.0% to 150.0% of the spring rates of the bearing 20.

Accordingly, it may be seen, that a relatively simple and inexpensive bearing isolator assembly, preferably comprised of all steel components, and which will dampen and/or isolate both radial and axial vibrations and is thus suitable for use with tapered bearings, has been provided.

Of course, an alternate construction of the bearing isolator assembly 70 could be provided by utilizing a radial wave spring that is of an axially shorter length in combination with an axial wave spring of an increased radial outer diameter.

While there has been described what at present is considered to be the preferred embodiment of this invention, it will be obvious to those skilled in the art that various changes and modifications may be made therein without departing from the spirit and the scope of the invention as hereinafter claimed.

We claim:

1. A bearing isolator assembly (70) for mounting a bearing of the type comprising a radially inner race 54, a radially outer race 58 and a plurality of roller members (62) to a housing (H) having an aperture (60) defining an inner diameter surface (57) for receipt of a bearing, said outer bearing race defining an axially outwardly facing surface (61) and an outer diameter surface (50), said bearing isolator assembly comprising:

a generally tubularly shaped radial wave spring (74) telescopically received on at least a portion of said outer bearing race outer diameter surface and radially interposed said outer diameter surface and the inner diameter surface of said aperture;

a generally washer shaped axial wave spring (76) adapted to be axially interposed said outer bearing race and an axially fixed axially inwardly facing surface (79, 121) defined by said housing; and a retaining member (72), said retaining member comprising a generally tubular shaped intermediate portion (84) having an inner diameter (94) generally equal to the largest outer diameter (92) of said radial wave spring, and an outer diameter (86) generally equal to the inner diameter of said aperture (60) in said housing, a radially outwardly extending flanged portion (80) at the axially outer end thereof and a radially inwardly extending flanged portion (82) at the axially inward end thereof, said radially inwardly extending flanged portion (82) having an inner diameter (98) smaller than the outer diameter (92) of said radial wave spring.

2. The isolator assembly of claim 1 wherein said radial wave spring defines a minimum inner diameter (104) less than the outer diameter of said outer bearing race.

3. The bearing isolator assembly of claim 2 wherein said radial wave spring and said axial wave spring are of a spring steel material.

4. The bearing isolator assembly of claim 2, wherein said radial wave spring (74) comprises a generally tubular member having a substantially constant radial wall thickness (100) in cross section and having an outer diameter surface defining a radial outer diameter substantially smoothly continuously and periodically varying from a maximum value (92) to a minimal value (102) at least three substantially equally circumferentially spaced locations about the circumference of said radial wave spring outer diameter surface.

5. The bearing isolator assembly of claim 2 wherein said axial wave spring (76) comprises a generally washer shaped member having a substantially constant axial wall thickness (110) in cross section and defining axially inwardly and outwardlymost surfaces (114 and 112) which are axially displaced from an axially fixed plane (116, 118) extending generally perpendicular to the axis (64) of said bearing by a distance substantially smoothly continuously and periodically varying from a maximum value to a minimal value at least three substantially equally circumferentially spaced locations about the circumference of said member.

6. The bearing isolator assembly of claim 2 wherein said retaining member is of a medium steel material.

7. The bearing isolator assembly of claims 1 wherein said radial wave spring and said axial wave spring are of a spring steel material.

8. The bearing isolator assembly of claim 7, wherein said radial wave spring (74) comprises a generally tubular member having a substantially constant radial wall thickness (100) in cross section and having an outer diameter surface defining a radial outer diameter substantially smoothly continuously and periodically varying from a maximum value (92) to a minimal value (102) at least three substantially equally circumferentially spaced locations about the circumference of said radial wave spring outer diameter surface.

9. The bearing isolator assembly of claim 7 wherein said axial wave spring (76) comprises a generally washer shaped member having a substantially constant axial wall thickness (110) in cross section and defining axially inwardly and outwardlymost surfaces (114 and 112) which are axially displaced from an axially fixed plane (116, 118) extending generally perpendicular to the axis (64) of said bearing by a distance substantially smoothly continuously and periodically varying from a maximum value to a minimal value at least three substantially equally circumferentially spaced locations about the circumference of said member.

10. The bearing isolator assembly of claim 1, wherein said radial wave spring (74) comprises a generally tubular member having a substantially constant radial wall thickness (100) in cross section and having an outer diameter surface defining a radial outer diameter substantially smoothly continuously and periodically varying from a maximum value (92) to a minimal value (102) at least three substantially equally circumferentially spaced locations about the circumference of said radial wave spring outer diameter surface.

11. The bearing isolator assembly of claim 10 wherein said axial wave spring (76) comprises a generally washer shaped member having a substantially constant axial wall thickness (110) in cross section and defining axially inwardly and outwardlymost surfaces (114 and 112) which are axially displaced from an axially fixed plane (116, 118) extending generally perpendicular to the axis (64) of said bearing by a distance substantially smoothly continuously and periodically varying from a maximum value to a minimal value at least three substantially equally circumferentially spaced locations about the circumference of said member.

12. The bearing isolator assembly of claim 10 wherein the difference between said maximum and minimum outer diameters is in the range of 0.1% to 50.0% of the mean outer diameter.

13. The bearing isolator assembly of claim 1 wherein said bearing is a tapered bearing.

14. The bearing isolator assembly of claim 13 wherein said axial wave spring (76) comprises a generally washer shaped member having a substantially constant axial wall thickness (110) in cross section and defining axially inwardly and outwardlymost surfaces (114 and 112) which are axially displaced from an axially fixed plane (116, 118) extending generally perpendicular to the axis (64) of said bearing by a distance substantially smoothly continuously and periodically varying from a maximum value to a minimal value at least three substantially equally circumferentially spaced locations about the circumference of said member.

15. The bearing isolator assembly of claims 1 wherein said axial wave spring (76) comprises a generally washer shaped member having a substantially constant axial wall thickness (110) in cross section and defining axially inwardly and outwardlymost surfaces (114 and 112) which are axially displaced from an axially fixed plane (116, 118) extending generally perpendicular to the axis (64) of said bearing by a distance substantially smoothly continuously and periodically varying from a maximum value to a minimal value at least three substantially equally circumferentially spaced locations about the circumference of said member.

16. The bearing isolator assembly of claim 1 additionally comprising substantially nondeformable means (82) for limiting the maximum radial movement of said bearing (20) relative to said retaining member.

* * * * *